Sept. 29, 1964     E. F. KURZINSKI     3,150,963
OPEN HEARTH FURNACES AND METHODS OF OPERATING THE SAME
Filed April 7, 1959     2 Sheets-Sheet 1
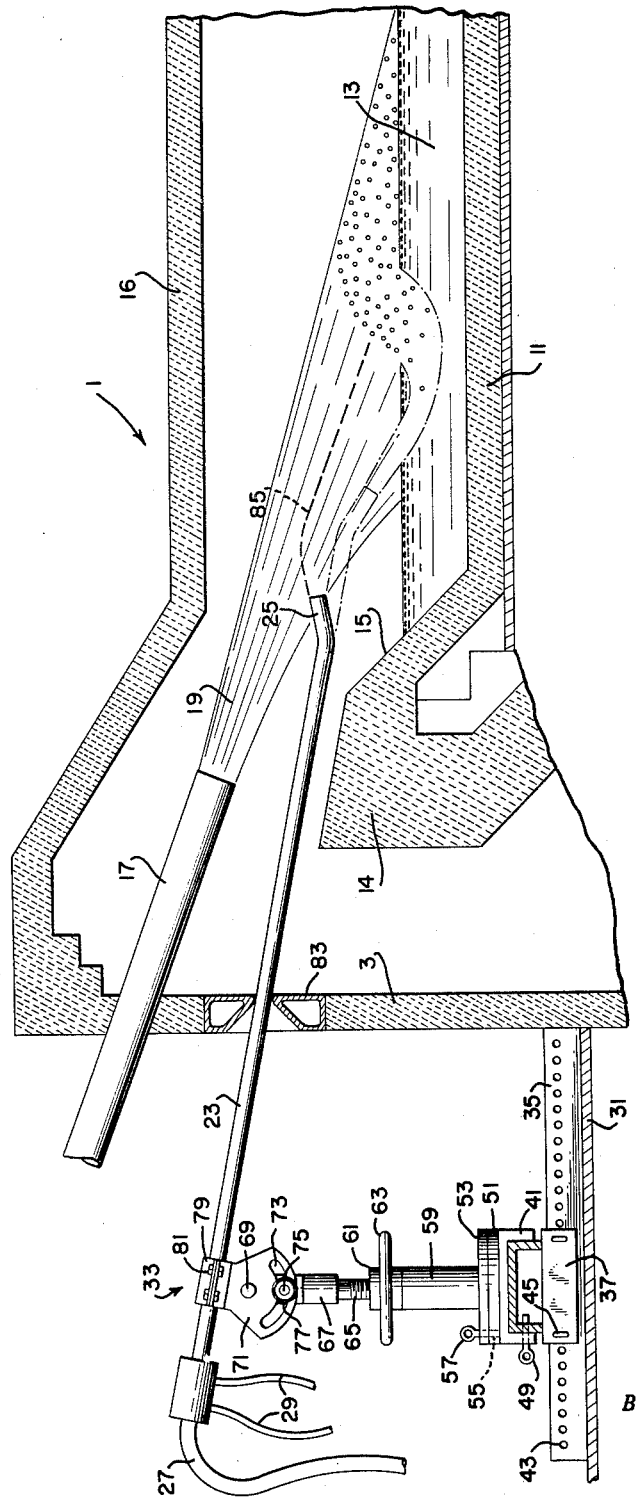
*INVENTOR.*
EDWARD F. KURZINSKI
BY Shanley & O'Neil
*ATTORNEYS*

Sept. 29, 1964 E. F. KURZINSKI 3,150,963
OPEN HEARTH FURNACES AND METHODS OF OPERATING THE SAME
Filed April 7, 1959 2 Sheets-Sheet 2
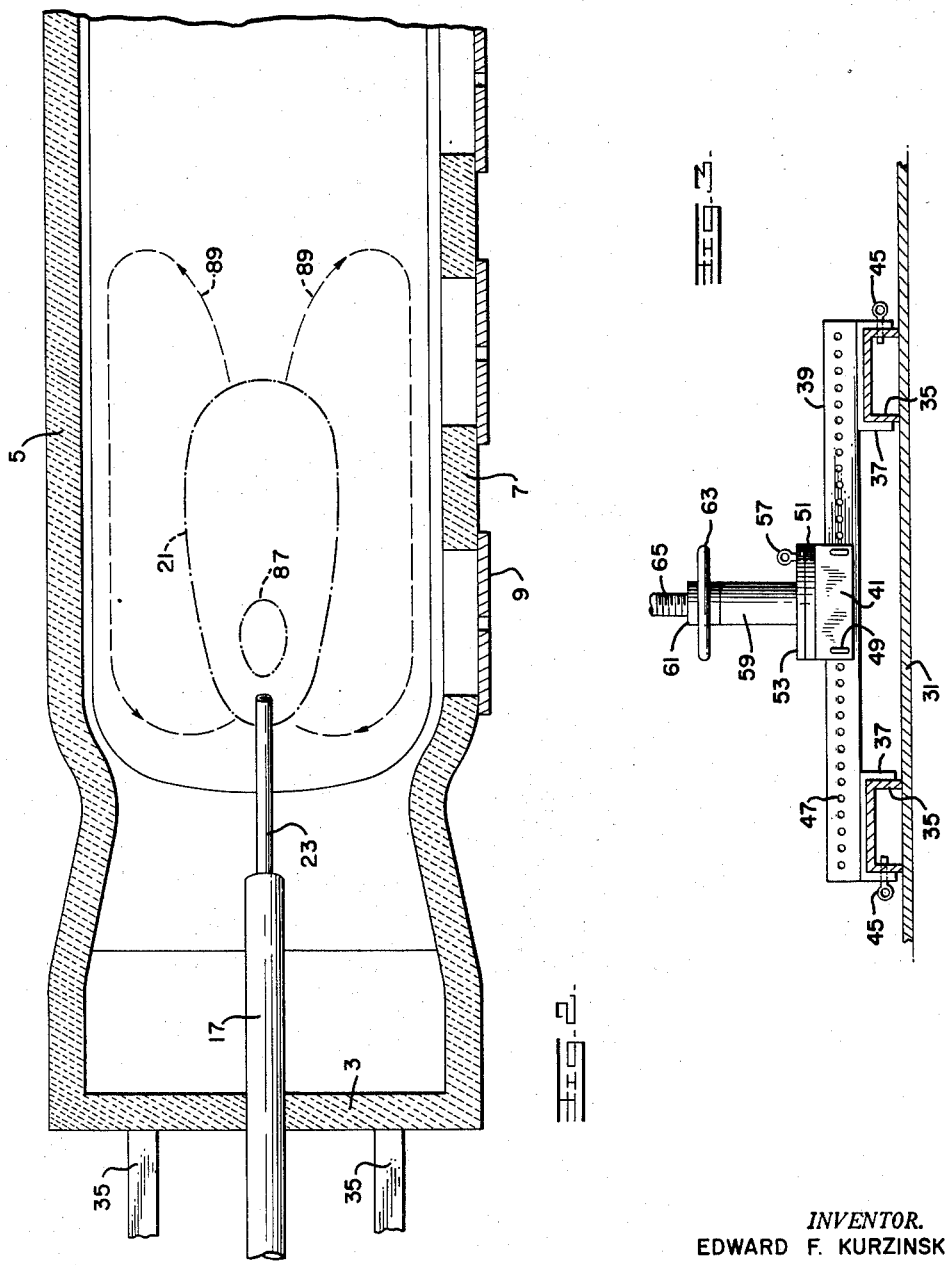
INVENTOR.
EDWARD F. KURZINSKI
BY Shanley & O'Neil
ATTORNEYS 3,150,963
OPEN HEARTH FURNACES AND METHODS OF
OPERATING THE SAME
Edward F. Kurzinski, Allentown, Pa., assignor, by mesne assignments, to Air Products and Chemicals, Inc., Trexlertown, Pa., a corporation of Delaware
Filed Apr. 7, 1959, Ser. No. 804,665
10 Claims. (Cl. 75—60)

The present invention relates to open hearth furnaces and methods of operating the same, and more particularly to apparatus and methods for the use of gaseous oxygen in such furnaces.

In recent years it has become common practice to shorten the heat time and hence increase the steel production of open hearth furnaces by introducing gaseous oxygen into the furnace in conjunction with the fuel mixture ejected from the burners or through the roof of the furnace by means of a jet or a lance. For example, following the charging of a furnace with scrap, it is common to enrich the flames from the end wall burners by adding oxygen to the combustible mixture. This raises the flame temperature and shortens the melting down period and also oxidizes the scrap to provide oxygen for the oxidation of the metalloids of the pig iron upon hot metal addition. However, the intensified heat which aids in melting the scrap also tends to damage the roof and greatly shortens roof life. Moreover, following the usual practice in which oxygen is introduced through conventional end burners, the bridge wall banks and the banks nearest the bridge walls are also subjected to the high temperature of the oxygen-enriched flame.

Accordingly, an object of the present invention is the provision of apparatus and methods for enriching the burner flames with oxygen without injury to the roof or other portions of the furnace.

At a later stage of the heat, during the working or refining period, when the charge is clear melted and heating of the molten charge is continued for the purpose of reducing the carbon content to that of the finished steel, it has been a frequent practice to blow gaseous oxygen onto the surface of the charge from oxygen jets or to introduce gaseous oxygen below the surface of the charge from oxygen lances. In this way, oxidation of carbon to carbon monoxide is greatly speeded up and the length of the refining period is reduced.

The evolution of carbon monoxide causes the charge to boil to a degree depending on the quantity of oxygen supplied. Indeed, the oxygen-induced boil during the refining period has heretofore been the factor which has limited the rate at which oxygen would be supplied for decarbonization, for excessive splash from a charge which is boiling too intensely will greatly reduce roof life and cause damage to other portions of the furnace as well.

Therefore, another object of the invention is the provision of apparatus and methods for supplying oxygen at relatively high flow rates but without damage from splashing.

A further object of the present invention is the provision of apparatus and methods effective to increase the speed and efficiency of carbon oxidation obtained by the use of a given quantity of oxygen during the refining period.

The same conditions which promote efficient oxidation of carbon to carbon monoxide by the use of oxygen jets, however, also promote the oxidation of iron to ferrous oxide which leaves the bath in the form of dense brown fumes. These fumes are apparently highly destructive to the refractory materials of the walls and roof of the furnace and in aggravated instances have caused the roof to collapse.

Hence, a further object of the present invention is the provision of apparatus and methods for using gaseous oxygen during the refining period without damage from these fumes.

The carbon monoxide released to the atmosphere of the furnace above the charge is available for further oxidation to carbon dioxide with the oxygen in the furnace atmosphere. This exothermic reaction supplies heat directly to the charge and also indirectly by heat exchange in the checkers and correspondingly reduces the heat requirements of the operation. However, under the conditions of the prior art, this reaction did not take place with sufficient completeness to recover all the heat values of the furnace atmosphere, and relatively large quantities of unreacted carbon monoxide and oxygen left the furnace and were effectively lost to the operation.

Therefore, a still further object of the present invention is the provision of apparatus and methods for promoting completeness of the oxidation of carbon monoxide to carbon dioxide in the furnace atmosphere.

When oxygen is supplied by a jet during refining, the jet is usually positioned less than twelve inches above the level of the molten charge. At least during the first portion of the refining period, when the carbon content is in excess of about 0.50%, there is always some splash resulting from this use of oxygen. This splash may not be great enough to reach the walls and roof of the furnace, but it reaches the tip of the jet and tends to form skull thereon. The encrustation of skull tends to block the jet discharge orifices and to build up to such size that the jet cannot be withdrawn from the furnace.

Accordingly, still another object of the present invention is to provide apparatus and methods for preventing the accumulation of skull on the jet tips.

Yet another object of the present invention is the provision of apparatus and methods for the use of oxygen for decarbonization which will promote strong and regular circulation in the molten charge.

Another object of the present invention is the provision of apparatus and methods which will reduce the quantity of equipment needed for the various uses of oxygen at different stages of a heat.

Finally, it is an object of the present invention to provide apparatus which is simple and inexpensive to manufacture, install, maintain and repair, easy and reliable to operate, and rugged and durable in use, and to provide methods which are easy to practice with dependable results so as to achieve high production.

Briefly stated, the present invention is characterized by apparatus comprising an oxygen jet extending not through the roof as heretofore, but rather through an end wall of the furnace adjacent the end wall burner, the jet being mounted for universal movement relative to the burner; and the invention is also characterized by methods comprising directing the oxygen stream against the underside of the burner flame a distance beyond the burner tip with the jet extending into the furnace at least as far as the edge of the charge, and at a later stage directing the oxygen stream downwardly within the area of the surface of the molten charge on which the burner flame impinges, with the tip of the jet not more than twelve inches above the charge and preferably with the jet tip disposed in the flame.

Other features, objects and advantages of the present invention will become apparent from a consideration of the following description taken in connection with the accompanying drawings, in which:

FIGURE 1 is a side cross-sectional view of a portion of an open hearth furnace according to the present invention;

FIGURE 2 is a plan view of the interior of a portion of an open hearth furnace according to the present invention; and FIGURE 3 is a fragmentary elevational view of the base of the oxygen jet support viewed endwise of the furnace.

Referring now to the drawings in greater detail, there is shown one end of an open hearth furnace indicated generally at 1, comprising a pair of end walls 3, only one of which is shown, at opposite ends of the furnace and spaced apart the length of the furnace. The end walls 3 are interconnected by a back wall 5 and a front wall 7 which is provided with a plurality of charging doors 9. The bottom of the furnace proper is comprised of the usual hearth 11 adapted to receive a mass of material 13 to be converted into steel. The charge in the furnace is confined by the usual banks and walls including bridge wall 14 and bridge wall bank 15. The furnace is closed at its top by the usual roof 16.

Extending through end wall 3 is the usual end burner 17 from which is discharged a combustible fuel mixture such as air and gas or steam-atomized oil such that when ignited, a flame 19 will be directed diagonally downwardly lengthwise of the furnace to impinge flame on an area of the surface of the charge adjacent the associated end wall of the burner, such as the area within line 21 as seen in FIGURE 2. Burner 17 is shown inclined diagonally downward; however, the important relationship is not that the burner be inclined out rather that at least a portion of the flame be inclined. As the flame diverges from the axis of the burner, the burner itself can even be horizontal.

The structure and function of the furnace as described thus far are entirely conventional.

An elongated oxygen jet 23 extends through end wall 3 of the furnace. Thus, jet 23 is an end wall jet, as distinguished from the roof jets and back wall jets of the prior art. Jet 23 terminates at its free end within the furnace in a jet head or tip 25 which is inclined at an angle of about 15° to the axis of the jet proper. The purpose of the jet is to supply a stream of gaseous oxygen to the interior of the furnace; and to this end, a supply line 27 connects the end of jet 23 outside the furnace with a source of oxygen under pressure (not shown). When the term "oxygen" is used herein, it is not in the limitative sense of 100% pure oxygen. Commercially pure oxygen, which is 99.5% pure, is preferred, but other mixtures of oxygen containing minor proportions of other gases are also included. The jet is cooled in the usual way by cooling water passing through conduits extending the length of the jet and conducted to and from the jet by cooling water supply and discharge lines 29.

Mounted on the charging floor 31 at one end of the furnace is an adjustable oxygen jet support indicated generally at 33. This support is comprised of a pair of relatively long downwardly opening channels 35 which rest on charging floor 31 and extend from end wall 3 away from the furnace parallel to the length of the furnace and parallel to each other. A pair of relatively short channels 37 having an interior configuration the same as the exterior configuration of channel 35 is slidably mounted one on each of channels 35. Channels 37 support between them a relatively long downwardly opening channel 39 perpendicular to channels 35, the ends of channel 39 being secured as by welding to the upper surfaces of channels 37. A relatively short channel 41 having an interior configuration the same as the exterior configuration of channel 39 is mounted for sliding movement on channel 39. Channels 35 are provided with a plurality of holes 43 through their outer vertical flanges and removable pins 45 extend through holes in the outer vertical flanges of channels 37 and into any selected holes 43 so as to fix the position of the assembly of channels 37 and 39 at any desired distance from end wall 3 along channels 35. Channel 39 is provided with a plurality of holes 47 along at least one of its vertical flanges, and removable pins 49 extend through holes in the corresponding flange or flanges of channel 41 and selectively into any of holes 47 to fix the position of channel 41 transversely of the length of the furnace at any desired position.

Fixedly secured to the upper surface of channel 41 is a circular plate 51 which comprises the lower half of a turntable, the turntable being completed by a circular plate 53 having a swivel connection with plate 51 for coaxial rotation relative to plate 51 about a vertical axis. Plates 51 and 53 are provided with a plurality of vertical holes therethrough, through any aligned pair of which a removable pin 57 is inserted to hold plates 51 in a desired position of rotation relative to each other. A hollow tubular standard 59 is rigidly secured coaxially to the upper surface of plate 53 and supports on its upper end an internally screw-threaded collar for rotation thereon through the medium of a hand wheel 63. A screw-threaded jack post 65 engages with the internal screw threads of collar 61 and extends guidedly down within standard 59, so that upon turning hand wheel 63, jack post 65 is raised or lowered.

Jack post 65 terminates upwardly in a head 67 which carries at its upper end a pivot 69 on which is mounted a bracket plate 71 for swinging movement about a horizontal axis. Bracket plate 71 is fan shaped and is provided with a slot 73 arcuate about the axis of pivot 69. A bolt 75 extends laterally from head 67 through slot 73 and screw-threadedly receives a nut 77 so that bracket plate 71 may be clamped to head 67 in any desired position of rotation about pivot 69. Bracket plate 71 terminates upwardly in a separable clamp 79 the two halves of which grasp jet 23 between them and are detachably interconnected by nut and bolt assemblies 81.

A portion of jet 23 spaced a substantial distance from clamp 79 toward tip 25 extends through an entry box 83 set in end wall 3. Box 83 may if desired be water cooled and has outwardly flared walls confronting jet 23, which converge in a circular opening not much larger than jet 23, so that the adjacent portion of jet 23 is supported in effect by a universal pivot.

The universal sliding and pivoting movement of jet 23 relative to box 83 is made possible by the various adjustments possible with support 33. To remove jet 23 from the furnace altogether, it is necessary only to open clamp 79 and slide jet 23 out through box 83. To adjust the position of jet 23 lengthwise, it is necessary only to loosen nut 77 and remove pins 45, whereupon the support assembly can be slid along channels 35 until jet 23 extends the desired distance into the furnace. Hand wheel 63 can be manipulated until the jet attains the desired angle to the horizontal, whereupon nut 77 may be tightened again. To swing the jet from side to side, pins 49 and 57 are removed and channel 41 is slid along channel 39 until the desired degree of sidewise swinging toward or away from the front wall or the back wall is achieved, whereupon pins 49 and 57 are reinserted in new sets of holes. As noted above, tip 25 is inclined to the axis of jet 23; and this arrangement is quite useful in certain operations which involve changing the angle between the stream of oxygen and the horizontal, by rotating the jet about its axis. To achieve this, clamp 79 is loosened and the jet rotated within the clamp. A limited amount of longitudinal adjustment of the jet may also be achieved by loosening the clamp and sliding the jet axially within the clamp. Accordingly, it will be appreciated that jet 23 is mounted for axial rotation, for axial sliding movement, for bodily movement in any direction, for universal swinging movement including up and down swinging movement and side to side slewing movement, and for any combination of these movements.

It is intended that when jet 23 is in the desired adjusted position, clamp 79 and nut 77 will be tight and pins 45, 49 and 57 will be in place, so that the whole of support 33 is rigid and jet 23 is held fixedly in the desired position. In these fixed positions, jet 23 extends in the same direction as its associated burner 17 in the sense that it is directed generally toward the opposite end wall and is not necessarily exactly parallel to burner 17.

Instead of being moved manually from position to position, support 33 may be motorized and its components power driven.

It will be understood that the furnace and associated equipment described above are bisymmetric about the transverse midplane of the furnace. Thus, the burners at opposite ends of the furnace fire alternately, each oxygen jet being used when its associated burner is firing.

An important feature of the present invention is the manner in which oxygen enrichment of the flame from the end wall burner may be practiced by use of an end wall oxygen jet according to the present invention. During the melting down period, when it is desired to apply the highest possible heat to the scrap without damaging the roof, the oxygen jet 23 is positioned as shown in full line in FIGURE 1. It is disposed beneath burner 17 and extends a substantial distance beyond the end of burner 17 within the furnace and terminates above the charge beyond the edge of the charge, that is, directly above the charge and beyond the exposed portion of the adjacent bridge wall bank 15. Tip 25 of jet 23 is inclined upwardly from the axis of the jet and is directed toward the underside of flame 19. In this way, the stream of oxygen issuing from jet 23 is directed against the underside of flame 19 a substantial distance from the point of efflux of the flame, that is, from the discharge end of the burner, beyond bridge wall bank 15 and directly over the charge. The oxygen striking the underside of the flame mingles with a lower portion of the flame which is indicated schematically in FIGURE 1 as the region below line 85. This region of the flame becomes much more luminescent that the remainder of the flame and attains a substantially higher temperature than the rest of the flame. The radiant heat emitted by this portion of the flame is much greater than that emitted by the remainder of the flame, and this greater radiant heat is "seen" by the scrap. The luminescent region of flame below line 85, however, is masked from the upper portions of the furnace and specifically from the roof of the furnace by the upper portions of flame 19, so that the radiant heat reaching the roof is not measurably greater than if no oxygen enrichment of flame 19 were practiced. Moreover, the luminescent region is positioned over the charge and not over the bridge wall as occurs when oxygen is added by conventional means through the end burner. Thus, most of the heat of the luminescent region is received by the charge rather than by the surrounding banks and walls, and damage to the banks and walls from overheating is avoided. In this way, the flame is enriched only where it needs to be enriched and the radiant heat resulting from this enrichment is utilized only where it needs to be used.

The velocity of the flame where the oxygen strikes it is 50 to 200 feet per second. Below this range, the impetus of the flame is insufficient to keep the oxygen stream from passing through the flame and overheating the roof; while above this range the flame impetus is so great as to cause molten material to be splattered on the front and back walls.

Molten pig iron is then charged to the furnace and there follows the ore boil and the lime boil. During the lime boil, lime rises through the bath, often in large chunks or floaters which do not dissolve or flux readily in the slag. At this stage, it is convenient to flux the lime floaters simply by directing the stream of oxygen on them, the universal mounting of the jet making this operation possible.

After the melting down period, the hot metal addition, the ore boil and the lime boil, there comes the working or refining period. During this time, the reduction of the carbon content of the molten charge proceeds primarily by oxidation of the carbon to carbon monoxide, which passes off to the gases of the furnace atmosphere. The gases above the bath are swept along the length of the furnace in the same direction as the flames, and leave through the checkers at the end of the furnace opposite the operating burner. During this passage lengthwise of the furnace, the carbon monoxide is further oxidized at least in part to carbon dioxide. This latter is an exothermic reaction which returns a measure of heat to the charge and reduces the overall fuel requirements of the refining operation. At the same time, the reaction consumes oxygen, so that the oxygen concentration decreases progressively from the firing burner end toward the other end of the furnace.

A very important feature of the present invention is the manipulation of the oxygen jet and the disposition of the oxygen stream issuing from that jet when the charge is clear melted and it is desired to use oxygen for decarbonization of the molten charge. At this stage, the jet is rotated 180° about its axis and it is advanced from the full-line position shown in FIGURE 1 to the phantom-line position shown in FIGURE 1. In this way, the stream of oxygen is swung downward and the tip of the jet is advanced into the flame so that it bathes in the flame. In this latter position, the point of efflux of the stream of oxygen, that is, the free end of the jet, is spaced no more than twelve inches above the surface of the molten charge. The stream of oxygen is thus directed against an area of the surface of the charge shown within the line 87 in FIGURE 2. This area lies within the area of the molten charge on which the flame impinges, as indicated by the circumscribed line 21.

The velocity of the flame in which the jet tip bathes is between about 50 and 200 feet per second. In this range, the flame impetus is effective to keep the jet tip free of material that splashes up on it from the bath. Also, the momentum of the flame, added to that of the stream of oxygen, is effective to induce a desirably strong circulation in the bath. Above this range, the molten charge tends to be splattered against the front and back walls. The area of the surface of the bath on which the flame impinges is elongated lengthwise of the furnace and generally oval-shaped; and it is preferred that the area on which the stream of oxygen impinges be located nearer the burner end of this elongated area from the other end of the area.

The oxidation of carbon to carbon monoxide at and below the surface of the bath is an exothermic reaction and tends to raise the bath temperature level. During the latter stage of the heat, a sensitive control over bath temperature level can be maintained by entraining iron ore, limestone or water in pulverulent or atomized form in the oxygen stream. The reduction of iron ore, the calcination of limestone and the water gas reaction are all endothermic reactions; and the inclusion of these materials in the oxygen stream permits regulation of the temperature level of the bath independently of the oxygen flow rate.

In order to enable persons skilled in this art to practice the present invention, the following illustrative example is given:

A 400-ton basic open hearth furnace receives an initial charge of 472,000 pounds of scrap iron having an average carbon content of 0.25%, and 45,700 pounds of limestone. The furnace is provided with fuel oil burners and end wall oxygen jets according to the present invention. Steam-atomized fuel oil is fed to the burner at a rate of 500 gallons per hour and is admixed with heated secondary air supplied through the checker system. The fuel is ignited and flames play on the scrap to initiate the melting-down period. The burner is inclined diagonally downward toward the scrap at an angle of 5° to the horizontal. An end wall oxygen jet is disposed so that it is inclined diagonally downward toward the scrap at an angle of 10° to the horizontal. The tip of the oxygen jet is inclined to the axis of the jet at an angle of 20°, and for the initial portion of the operation the tip is up and at an angle of 10° above the horizontal and is disposed directly over the charge. Oxygen of 99.5% purity at a pressure of about 75 p.s.i. gauge is fed to the jet at a rate of 40,000 cubic feet per hour through a cylindrical bore nozzle and issue from the jet at a velocity of about 980 feet per second. This stream of gaseous oxygen strikes the underside of the flame about 8 feet from the burner tip, where the flame has a velocity of about 75 feet per second, causing an area of incandescence which cannot be seen from the roof but which emits radiant heat to the scrap. The end wall burners at each end of the furnace are fired alternately and the melting period requires 210 minutes.

At the end of this time, 404,500 pounds of molten blast furnace basic iron containing about 4.2% carbon is introduced into the open hearth. During this hot metal addition and during the ore boil and the lime boil, the end burners continue to fire alternately but at a somewhat reduced rate of fuel consumption.

The oxygen end jet is then twisted 180° about its axis and is slid through its clamping collar farther into the furnace so that its axis remains in the same location but its tip now points downward at an angle of 30° to the horizontal and is spaced 10 inches above the surface of the molten charge. Oxygen is caused to flow through the jet at a rate of 20,000 cubic feet per hour at a supply pressure of about 50 p.s.i. gauge and an emergent velocity of about 980 feet per second. The carbon content of the molten charge at this point is about 1.80%. The free end of the jet is bathed in flames for a distance of about 24 inches rearwardly of the jet tip and oxygen leaves the jet at a point where the flame has a velocity of about 75 feet per second. The stream of oxygen strikes the surface of the bath within the area impinged upon by the flames. Oxygen addition is continued in this manner for 345 minutes until the carbon content reaches 0.07%, the oxygen flow rate from the jet being increased to 60,000 cubic feet per hour at about 0.45% carbon. At the end of the heat, the molten charge has a temperature of 2,950° F., which temperature level is achieved without recarbonization. The furnace is then tapped to yield 382 tons of steel.

At the end of the heat, it is observed that splash to the roof has been kept to a minimum, the circulation of the molten charge has been strong and thorough, the tip of the oxygen jet has remained free from skull or solid deposits, the release of heavy smoke to the furnace atmosphere has been almost eliminated and the heat balance has approached the theoretical optimum.

The use of end wall jets and manipulative procedures according to the present invention results in at least ten principal advantages not obtainable prior to the advent of the present invention, as follows:

(1) The same oxygen jet is useful for oxygen enrichment of the flame in a manner which will not damage the roof, for scrap oxidation, for lime fluxing, and for decarbonization during refining.

(2) As the oxygen impinges within the flame on the hottest portion of the bath, the oxidation of carbon to carbon monoxide proceeds with the greatest rapidity and efficiency.

(3) Although efficient oxidation of carbon to carbon monoxide also increases the production of heavy brown fumes of ferrous oxide, damage from these fumes is prevented. By the practice of this invention, these fumes emerge within the flame and are apparently rapidly oxidized to ferric oxide and are carried back to the surface of the bath where they join the slag.

(4) As the boil occasioned by the oxidation of carbon to carbon monoxide occurs almost entirely within and beneath the area of the surface of the bath on which the flame impinges, the flame serves in effect as an umbrella which keeps almost all of the resulting splash from reaching the roof of the furnace.

(5) The splash emerges into the flame and is impelled by the flame along the length of the furnace. Accordingly, almost all of the splash is driven back onto the surface of the molten charge by the flame or falls by gravity onto the surface of the charge lengthwise of the furnace beyond the flame. As this splash originates adjacent one end of the furnace, the end walls of the furnace as well as the front wall and back wall are protected from splash.

(6) As the splash originates adjacent the firing burner end of the furnace, such splash as nevertheless rises in the furnace contacts the atmosphere of the furnace where that atmosphere is richest in oxygen. This escaping proportion of the splash is therefore largely oxidized and improves the efficiency of carbon content reduction.

(7) Gaseous oxygen can be used in open hearth practice at greatly increased flow rates.

(8) Another very important advantage arises from the fact that during refining, the stream of oxygen is applied to the surface of the molten charge in the same direction as the flame and within the area on which the flame impinges strongly on the bath, with the result that the forces applied to the charge by the high velocity flame and oxygen stream are superposed and cumulative. These combined forces induce a strong circulation in the molten charge along paths and in directions indicated by the lines 89 in FIGURE 2, so that a systematic and thorough exposure of the molten charge to the refining agencies is achieved.

(9) The oxidation of carbon monoxide within the furnace is much more nearly complete than in the prior art practices. The quantity of the mixture of unreacted oxygen and carbon monoxide leaving the furnace is relatively very small. As a result, the heat available from this exothermic reaction is largely recovered either directly by the bath or indirectly by heat exchange in the checkers. Apparently, this desirable result is due to a combination of two factors: most of the carbon monoxide is evolved into the flame where it is rapidly heated to reaction temperature; and then, at that temperature it passes almost full length of the furnace and thus has ample reaction time at reaction temperature.

(10) The positioning of the jet tip directly in high velocity portions of the flames prevents the formation of encrustations thereon known in the art as "skull." The high temperature imparted to the jet tip by the flame prevents the solidification of these materials on the jet tip.

From a consideration of the foregoing, it will be obvious that all of the initailly recited objects of the present invention have been achieved.

Although the present invention has been described and illustrated in connection with preferred embodiments, it is to be understood that modifications and variations may be resorted to without departing from the spirit of the invention, as those skilled in this art will readily understand. For example, although the invention has been illustrated in connection with single burners at each end of the furnace, it will be understood that oil burners may be provided at each end of the furnace with an oxygen jet disposed beneath each burner. These and other modifications and variations are considered to be within the purview and scope of the present invention as defined by the appended claims.

What is claimed is:

1. An open hearth furnace having a wall, a burner extending through the wall and adapted to direct a flame diagonally downward toward the surface of a molten charge in the furnace, an oxygen jet comprising an elongated conduit for gaseous oxygen extending through said wall and having an end portion within the furnace disposed at an acute angle to the axis of the jet, and means mounting the jet for rotation relative to the burner about said axis.

2. Structure as claimed in claim 1, and means mounting the jet for lengthwise movement toward and away from the furnace of a molten charge in the furnace.

3. Structure as claimed in claim 2, and means mounting the jet for swinging movement relative to the burner transversely of said axis.

4. Structure as claimed in claim 1, and means mounting the jet for swinging movement relative to the burner transversely of said axis.

5. An open hearth furnace having a wall, a burner extending through the wall and adapted to direct a flame diagonally downward toward a charge in the furnace, and an oxygen jet comprising an elongated conduit for gaseous oxygen having a first portion extending through said wall and extending a substantial distance into the furnace below the burner and a second portion extending from the end of said first portion within the furnace toward the axis of the burner at an acute angle both to the axis of the burner and to the axis of said first portion, the axis of said second portion intersecting the axis of the burner at a point spaced a substantial distance from the tip of the burner, the angle between the axis of said second portion and the axis of the burner being substantially greater than the angle between the axis of said first portion and the axis of the burner.

6. In a method of making steel in an open hearth furnace which comprises directing a flame diagonally downward toward a charge from a wall burner adapted to discharge a combustible fuel mixture, so as to impinge the flame upon the charge adjacent the associated wall of the burner, the improvement comprising, first directing a stream of oxygen in an upwardly discharging direction against the underside of the flame from a location directly over said charge, but below the flame and spaced a substantial distance forward of the tip of the burner, and thereafter directing the stream of oxygen diagonally downward toward said charge in the same direction as said flame and from a location directly over said charge.

7. The method as in claim 6 in which said hearth contains molten charge before said stream of oxygen is discharged downwardly, and in which the point of efflux of the downwardly discharging oxygen stream is spaced not more than twelve inches above the surface of the molten charge.

8. The method as in claim 7 in which said downwardly discharging stream of gaseous oxygen is directed against the surface of the molten charge within the area upon which said flame impinges.

9. The method as in claim 8 in which said point of efflux of the downwardly discharging oxygen stream is located within said flame.

10. The method as in claim 8 in which the respective discharge characteristics of the flame and the upwardly discharging gaseous oxygen stream are such as to preclude complete penetration of the flame by the oxygen stream.

References Cited in the file of this patent

UNITED STATES PATENTS

| 1,809,436 | Carman | June 9, 1931 |
| 2,534,454 | Kay et al. | Dec. 19, 1950 |

FOREIGN PATENTS

| 751,629 | Great Britain | July 4, 1956 |
| 566,732 | Belgium | May 15, 1957 |
| 819,834 | Great Britain | Sept. 9, 1959 |

UNITED STATES PATENT OFFICE
CERTIFICATE OF CORRECTION

Patent No. 3,150,963                                  September 29, 1964

Edward F. Kurzinski

It is hereby certified that error appears in the above numbered patent requiring correction and that the said Letters Patent should read as corrected below.

Column 5, line 34, for "that" read -- than --; column 8, line 49, for "initailly" read -- initially --; coluumn 9, line 2, for "furnace", first occurrence, read -- surface --.

Signed and sealed this 20th day of July 1965.

(SEAL)
Attest:

ERNEST W. SWIDER                                      EDWARD J. BRENNER
Attesting Officer                                          Commissioner of Patents